United States Patent
Ma

(10) Patent No.: US 9,700,786 B2
(45) Date of Patent: Jul. 11, 2017

(54) HETEROMORPHIC ATTACHMENT AND SYSTEM USED IN LASER GUNFIGHT GAME

(71) Applicant: Kali Ma, Guangdong (CN)

(72) Inventor: Kali Ma, Guangdong (CN)

( * ) Notice: Subject to any disclaimer, the term of this patent is extended or adjusted under 35 U.S.C. 154(b) by 0 days.

(21) Appl. No.: 14/821,110

(22) Filed: Aug. 7, 2015

(65) Prior Publication Data

US 2016/0030832 A1 Feb. 4, 2016

Related U.S. Application Data

(63) Continuation of application No. PCT/CN2013/071529, filed on Feb. 7, 2013.

(51) Int. Cl.
| | | |
|---|---|---|
| *A63F 9/02* | (2006.01) | |
| *A63H 3/36* | (2006.01) | |
| *A63H 3/40* | (2006.01) | |
| *A63H 3/50* | (2006.01) | |
| *A63F 13/822* | (2014.01) | |
| *A63F 9/24* | (2006.01) | |

(52) U.S. Cl.
CPC ............ *A63F 9/0243* (2013.01); *A63F 9/02* (2013.01); *A63F 9/24* (2013.01); *A63F 13/822* (2014.09); *A63H 3/365* (2013.01); *A63H 3/40* (2013.01); *A63H 3/50* (2013.01); *A63F 2009/2444* (2013.01)

(58) Field of Classification Search
CPC ..................................... A63F 9/02; A63F 9/24
USPC .......................................................... 463/5
See application file for complete search history.

(56) References Cited

U.S. PATENT DOCUMENTS

| 6,071,166 A | 6/2000 | Lebensfeld et al. | |
|---|---|---|---|
| 7,967,679 B2* | 6/2011 | Ombrellaro ............ | A63F 13/02 463/30 |
| 2002/0111201 A1* | 8/2002 | Lang ....................... | A63F 13/12 463/2 |
| 2005/0113167 A1* | 5/2005 | Buchner ................ | A63F 13/02 463/30 |

(Continued)

FOREIGN PATENT DOCUMENTS

| CN | 200998588 Y | 1/2008 |
|---|---|---|
| CN | 201497702 U | 6/2010 |

(Continued)

*Primary Examiner* — David L Lewis
*Assistant Examiner* — Shauna-Kay Hall
(74) *Attorney, Agent, or Firm* — Muncy, Geissler, Olds & Lowe, P.C.

(57) ABSTRACT

A heteromorphic attachment and a system used in a laser gunfight game, including: a heteromorphic body, at least one movable unit located on the heteromorphic body, a driving device for driving the at least one movable unit to operate, and a control circuit, wherein the heteromorphic body and the at least one movable unit are formed by a surface rubber film. A transitional module is provided on the heteromorphic attachment, and used for placing or attaching the heteromorphic attachment on a game participant or game facility or game field. A laser transmitter and/or an infrared transmitting tube is also provided on the heteromorphic attachment, and used for transmitting a laser encoding signal and/or an infrared encoding signal. A human body sensor is further provided on the heteromorphic attachment.

17 Claims, 16 Drawing Sheets

(56) References Cited

U.S. PATENT DOCUMENTS

| | | | | |
|---|---|---|---|---|
| 2005/0282633 A1* | 12/2005 | Nicolas | ................... | A63F 13/06 463/36 |
| 2007/0297117 A1* | 12/2007 | Elliott, Jr. | ............... | F41A 33/02 361/232 |
| 2008/0194337 A1* | 8/2008 | Hensel | ............... | A63B 24/0021 463/48 |
| 2011/0067157 A1* | 3/2011 | Xiao | ...................... | B25J 9/0006 2/2.11 |

FOREIGN PATENT DOCUMENTS

| | | |
|---|---|---|
| CN | 202650010 U | 1/2013 |
| JP | 2003-169963 A | 6/2003 |

* cited by examiner

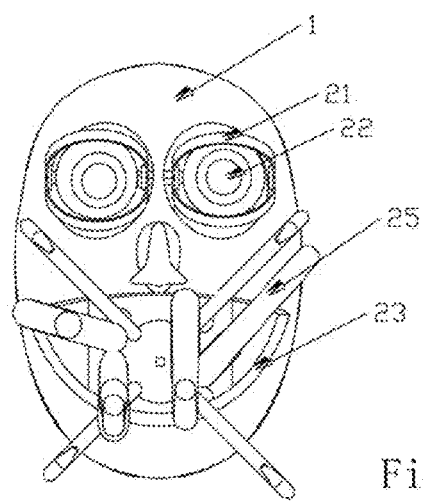
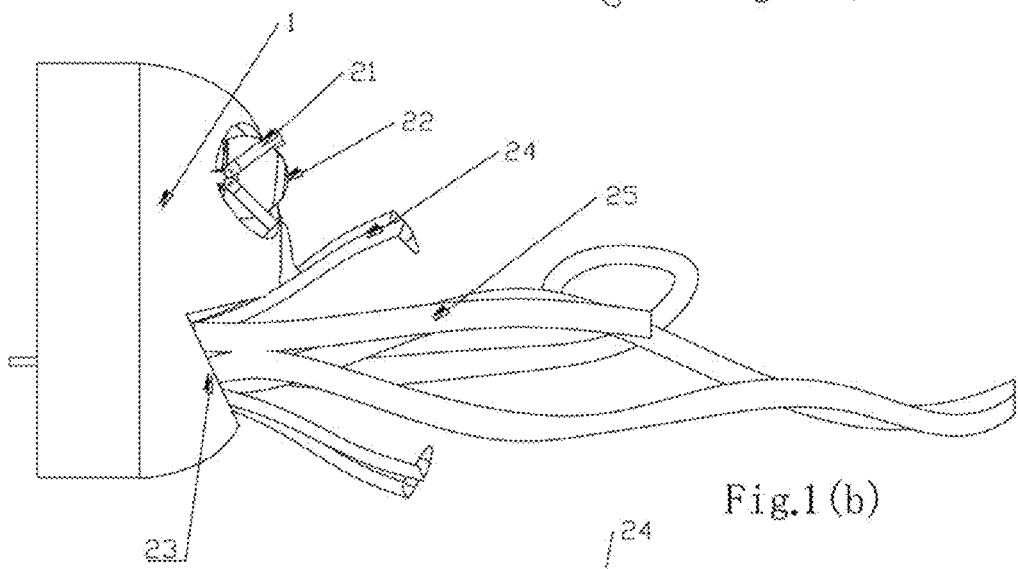
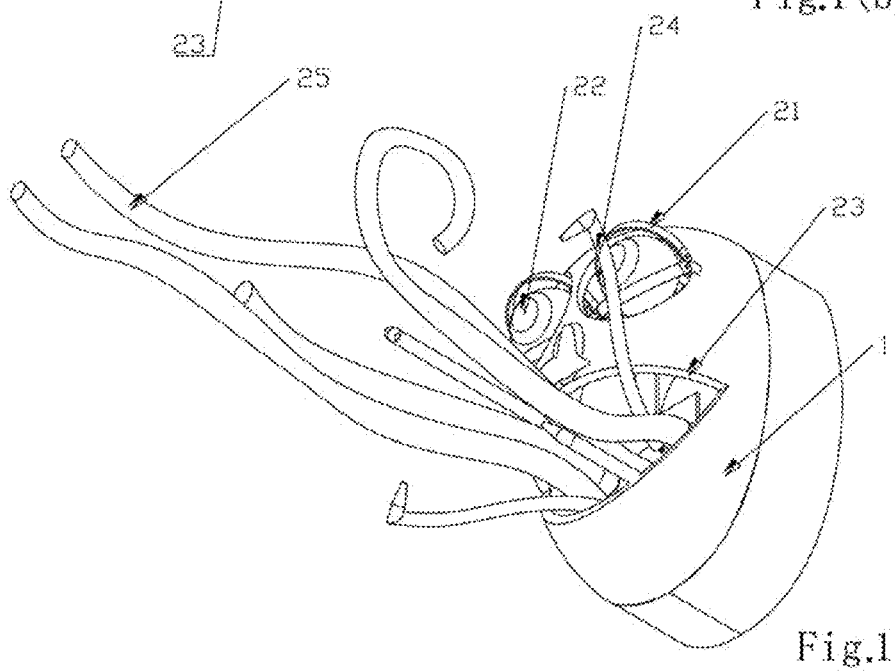
Fig.1(a)
Fig.1(b)
Fig.1(c)

HETEROMORPHIC ATTACHMENT AND SYSTEM USED IN LASER GUNFIGHT GAME

TECHNICAL FIELD

The present invention relates to the field of laser shooting games, more particularly, to a heteromorphic attachment and a system in a laser gunfight game.

BACKGROUND

It is now a very popular game way of using laser shooting to simulate gunfight. Laser shooting can not only simulate the effect of live-fire target practice which makes players firsthand enjoy the fun of gunfight games, but also pose no danger to players, and therefore are liked by a majority of players.

Role-Playing Games (RPG) is the most popular game type among computer games (which comprise stand-alone game and online game). In such a game mode, a player plays a certain role in the virtual world and moves in a set scene, each role has various virtual ability parameters and skills, wherein ability parameters refer to power, physical strength, level of sensitivity, intelligence, magic, luck, etc.; skills refer to the moves or actions that could be launched, since the strong sense of engagement of RPG brings the players immersive experience, RPG games has long been making the players indulge and cannot extricate themselves.

However, for a long time, RPG games exist in the virtual world, a player who like RPG games can only acquire such experience in front of a computer which makes the player sit in front of the computer for a long time, health of the player is greatly damaged on one hand, and increasingly serious family and social problems are caused on the other hand. Based on the above problems, applicant of the present invention has been dedicating to bring the mode of RPG into reality, for example, a Chinese invention patent filed on Feb. 19, 2012, Application No. 201210019276.5, titled "Live RPG Game System". In the technical solution of the said patent, a player may join RPG games in the real world, experience the satisfaction and irritation brought by RPG games and achieve the effect of physical fitness at the same time, this new type of game mode may also attract a part of addiction players who are indulged in RPG online games, pull them out of the online virtual world and help them get rid of network addiction.

In the above game with live RPG concept, not only positive roles are set for players to select according to game plots, but also villain roles such as various enemies and monsters are set for player to fight with. It is difficult to simulate some popular game elements and story plots such as biochemical crisis and alien monster invasion in the optical signal shooting fight game with prior art, for example, it is difficult to simulate the plot of mutation of infected person or building and growing of mutation tissues after the invasion of heteromorphic virus. Therefore, prior art cannot give a player the immersive feeling on seeing and hearing.

SUMMARY OF THE INVENTION

The present invention designs a heteromorphic attachment specifically used in a laser gunfight game on the basis of existing laser shooting fight game technology and overcomes the disadvantages of prior art, the heteromorphic attachment combines the most popular elements of commercial movies and computer games in the appearance and structure, proposes a novel mode for laser shooting fight games, which makes players completely immerse in the terrible scenes of biochemical crisis and aliens invasion, and fight with a heteromorphic attachment provided in a building or on the combating suit of staff using a laser gun in the hand.

The target of the present invention is to design a device which could be bound on the staff or fixed in a variety of buildings, the device will be designed in appearance to be a heteromorphic attachment as shown in the horror movies which could make a variety of stretching movements, shine, make sounds and attack the participating players. When it is bound on the staff, the staff may be made to play a monster attacking a player actively. When it is fixed in a building, the building will be arranged to be a game scene full of a variety of horrible traps, which make players in the game truly experience the feeling of a leading actor in the science fiction, horror movies or computer games.

The heteromorphic attachment and the system having the heteromorphic attachment proposed by the present invention may be widely applied in the laser shooting fight games and enrich the entertainment of such games greatly, make a player attack the heteromorphic attachment and the system and vice versa, which increases the difficulty and challenge of a game, adds new variables, and increases the interestingness of a game. Comparing with existing laser war games, the heteromorphic attachment system proposed by the present invention needs a lot of manpower and resources to arrange the game scenes, and is not limited to a fight between one team and another team, but a fight between a man and a monster, therefore, it is particularly proper to arrange the game scenes in a large scale theme part or playground and it opens to strange player teams of different size, after a game starts, the game scene may constantly accept any player to enter the game, inning numbers will not be counted, the system may automatically compute the game time of respective player, or compute the survival time and score based on the number of monsters killed, and reward with prizes.

In order to achieve the above target, the following technical solution is employed:
a heteromorphic attachment used in a laser gunfight game, comprising: a heteromorphic body, at least one movable unit located on the heteromorphic body or connected to the heteromorphic body, a driving device for driving the at least one movable unit to operate, and a control circuit, wherein
the heteromorphic body and the at least one movable unit are formed by a surface rubber film;
a transitional module is also provided on the heteromorphic attachment, and used for placing or attaching the heteromorphic attachment on a game participant or a game facility, or in a game field; wherein the transitional module for binding the heteromorphic attachment on the game participant is a bandage or a belt, the transitional module for attaching, fixing the heteromorphic attachment in a game field is a variety of fasteners, such as a bandage, a ring, a hook, etc.;
a laser receiver is also provided on the heteromorphic attachment, and used for receiving a laser encoding signal in the game;
a laser transmitter and/or an infrared transmitting tube is also provided on the heteromorphic attachment, and used for transmitting a laser encoding signal and/or an infrared encoding signal;

a human body sensor is also provided on the heteromorphic attachment, when a game participant is sensed to approach, the control circuit starts the driving device to drive the at least one movable unit to operate.

Preferred, a lighting effect module and/or a sound effect module is also provided on the heteromorphic attachment, and wherein the lighting effect module may be a LED light of various colors or a fiber tube; the sound effect module may be a loudspeaker and/or a microphone.

Preferred, an infrared transmitting tube for close attacking may also be provided on the heteromorphic attachment.

Preferred, the heteromorphic attachment also connects to an auto dropping device, and the device comprises a dropping body, a control circuit provided in the dropping body, a driving device connected to the control circuit, and a connecting unit provided on an end of the dropping body and used for connecting to another body, the connecting unit connects to the driving device, and the driving device drives the connecting unit to disconnect with the heteromorphic attachment under the control of the control circuit.

Furthermore, in the present invention, the driving device used in the heteromorphic attachment or the auto dropping device may employ a motor or an electromagnet to drive gears to rotate or make linear movement, or a small air pump to drive an air cylinder to move, or a miniature oil pump to drive an oil cylinder to move.

Furthermore, the connecting unit specifically comprises an end cover and a locking position, the end cover connects to the heteromorphic attachment, the locking position is provided on the end cover and connects to the driving device; the driving device connects to the control circuit, the control circuit controls the driving device to operate, making the locking position loose, so that the end cover is disconnected with the heteromorphic attachment.

Preferred, a spring is also provided in the connecting unit, the spring connects to the locking position in order to control the locking position to restore, or the spring is provided on the end cover, when the end cover and the heteromorphic attachment disconnect with each other, the dropping body is popped up by the elastic force of the spring.

Preferred, an effect module is also provided in the connecting unit, the effect module extends from the connecting unit and moves under the control of the driving device, and the effect module is embodied as a plurality of movable tentacles.

Preferred, an omnibearing vibration sensor for detecting the vibration frequency and an infrared transmitting tube for close attack are provided on the auto dropping device, the infrared transmitting tube is controlled to transmit an infrared signal when vibration is detected.

Preferred, a lighting effect module and/or a sound effect module is also provided on the auto dropping device, and wherein the lighting effect module may be a LED light of various colors or a fiber tube; the sound effect module may be a loudspeaker and/or a microphone.

Another aspect of the present invention proposes a system having the heteromorphic attachment, comprising: at least one heteromorphic attachment, a laser gun used by a player and a combat suit, and a remote control switchboard, wherein the structure of the heteromorphic attachment is stated as above, a laser receiver and a control circuit are provided on the combat suit, and used for receiving a laser pulse encoding signal transmitted by the laser transmitter in the heteromorphic attachment; and a wireless module for communicating with a wireless device and corresponding control circuit are provided on the remote control switchboard.

Preferred, an infrared receiving tube is also provided on the combat suit, and used for receiving an infrared pulse encoding signal transmitted by the infrared transmitting tube in the heteromorphic attachment and/or the infrared transmitting tube in the dropping unit.

Preferred, an effect controller may also be provided in the system, and used for controlling movements of the heteromorphic attachment.

In addition, a camera for monitoring is also provided in the system in order to ensure the game is fair and impartial, and film and record violations during the game in time.

BRIEF DESCRIPTION OF THE DRAWINGS

In order to describe the present invention more clearly, further explanations are made in conjunction of the drawing and embodiments as follows.

FIG. 1(a)-1(c) are the front view, lateral view and perspective view of the structure of the heteromorphic attachment in the first embodiment of the present invention;

FIG. 8 is an effect diagram of the heteromorphic attachment film formed in the third embodiment of the present invention;

Figure 2A:
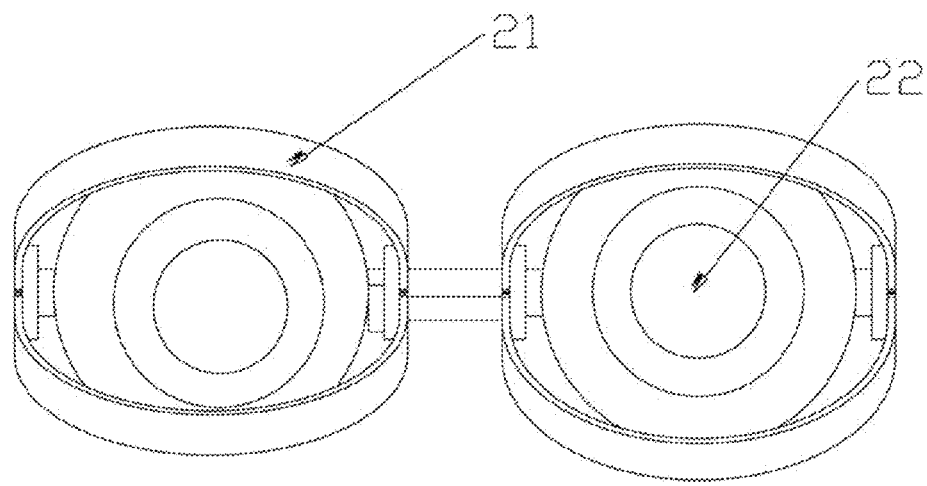
FIG. 2(a)-2(c) are the front view, lateral view and perspective view of the eye structure of the heteromorphic attachment in FIG. 1(a)

Wherein, in the Figures, 1, 1', 1", 1'"—heteromorphic body, 21, 21', 21"—the first movable unit, 22, 22', 22"'—the second movable unit, 23, 23"—the third movable unit, 24—the fourth movable unit, 25—the fifth movable unit, 26—the sixth movable unit, 2'—body. 3'—root part, 24"'—auto dropping device, 241—left end cover, 242—tentacle, 243—bump, 243'—locking position, 244, 244'—spring, 245—control circuit. 246—motor, 247—motor in the joint.

DETAILED DESCRIPTION OF THE INVENTION

Detailed embodiments of the present invention are given in the following.

The First Embodiment

The present first embodiment illustrates a heteromorphic attachment used in a laser gunfight game of the present invention in particular, please refer to FIGS. 1(a)-1(c). In the present first embodiment, the heteromorphic attachment attaches a combat suit of the staff in particular, wherein a heteromorphic body is shaped as a man face, on which main organs such as brows, eyes, noses and mouth are formed similar to a man face, that is, the rubber film of the heteromorphic body 1 is made by elastic material such as silica gel, latex, Vinyl, and rubber, the present first embodiment employs the silica gel which is similar to human skin in texture and color, odorless, non-toxic, and has excellent thermostability and stable chemical properties.

Five movable units are provided on such a heteromorphic body 1, and are the first movable unit 21 and the second movable unit 22 located in the eye part, and the third movable unit 23, the fourth movable unit 24, the fifth movable unit 25 located in the mouth part, respectively.

In the design of the present invention, a driving device is classified into the first driving device and the second driving device according to the difference of driving mode, the first driving device means that driving force is provided by the rotation of gears or transmission shaft driven by a motor or electromagnet, the second driving device means that driving force is provided by an air cylinder driven by a small air pump or an oil cylinder driven by a miniature oil pump, or the rubber film is filled with gas by a small air pump directly, which is preferred to be employed when slender tentacles are driven, as shown by the fifth movable unit 25 in the present first embodiment, details will be explained below.

Figure 2B:
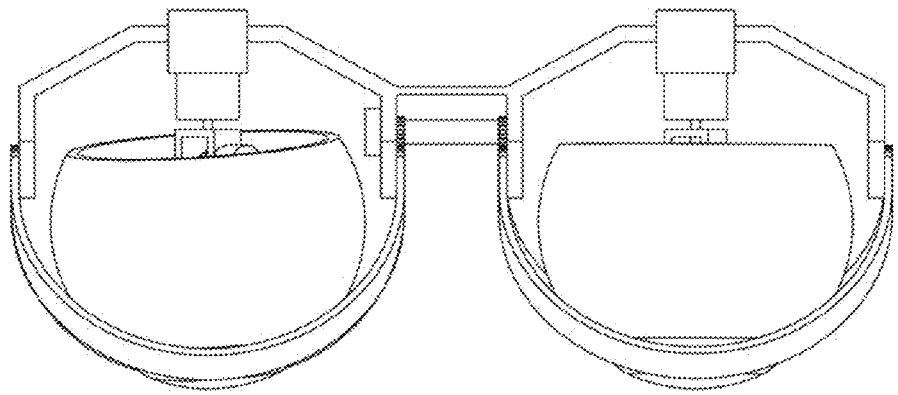
Figure 2C:
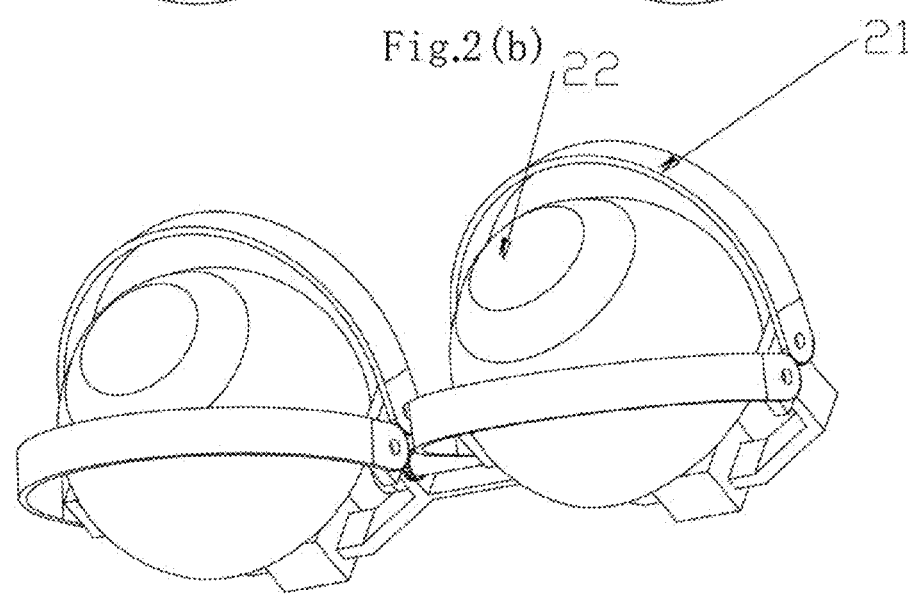

Please refer to FIGS. 2(a)-2(c), as shown by the drawings, movable eyes are provided in the first embodiment according to the formation of a human face, each eye comprises the first movable unit 21 and the second movable unit 22 located in the eye part, respectively. The first movable unit 21 is embodied as upper and lower eyelids which may open and close, the eyelids may open or close, and may perform blinking movement under the driving of the first driving device connected. The second movable unit 22 is an eyeball which may rotate in the eye, in the same way, the eyeball may rotate in different directions up and down, left and right under the driving of the first driving device connected. The first driving device drives the first movable unit 21 and the second movable unit 22 to operate, providing driving force for their movement.

The third movable unit 23 is upper and lower lips which may open or close on the heteromorphic body 1, and also connects to the first driving device, and lips may open or close under its driving. The fourth movable unit 24 is four talons and fangs extending out of the mouth after the mouth opens, these talons and fangs extend out of the mouth to upper left, lower left, upper right and lower right as the mouth opens under the driving of the first driving device, when the mouth closes, they move back into the mouth under the driving of the first driving device. In the present first embodiment, the first driving device employs a motor or an electromagnet which drives a gear or transmission shaft to rotate in order to provide driving force, driving the eyelids of the first movable unit 21 to open or close, driving the eyeball of the second movable unit 22 to rotate, driving the mouth of the third movable unit 23 to open or close, and driving the talons and fangs of the fourth movable unit 24 to extend and move back.

Figure 3A:
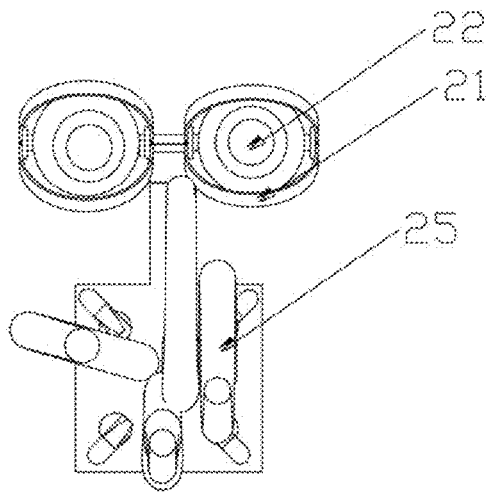
FIG. 3(a)-3(c) are the front view, lateral view and perspective view of the eye and mouth structure of the heteromorphic attachment in FIG. 1(a)
Figure 3B:
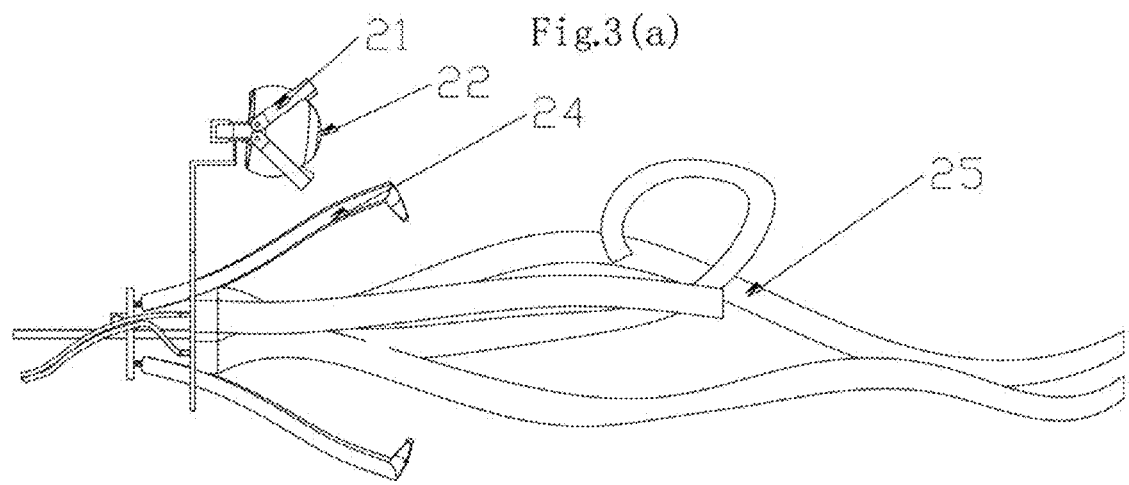
Figure 3C:
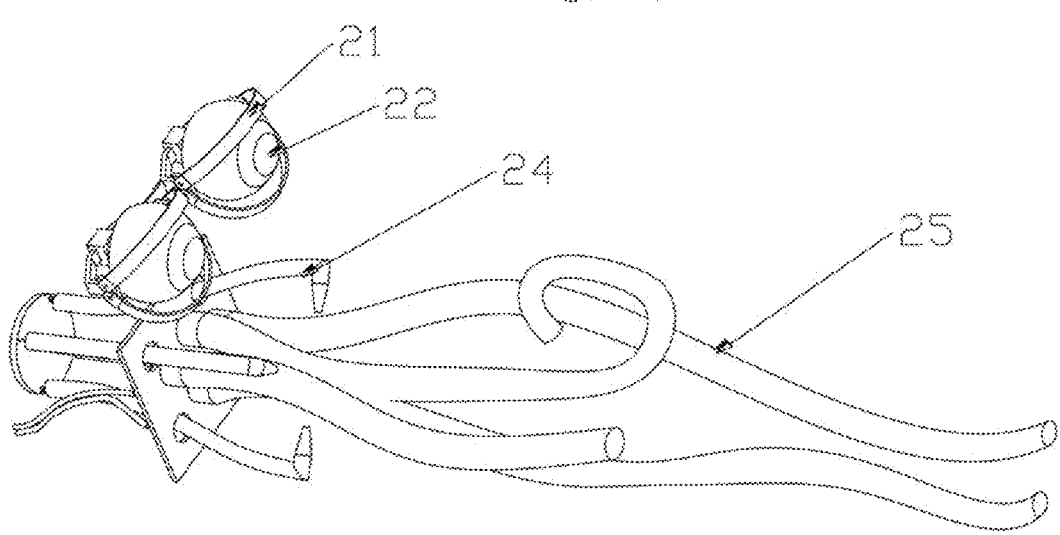

The fifth movable unit 25 is a plurality of tentacles in the mouth, these tentacles are also formed by a rubber film, and are shaped like strips, the lengths of tentacles are different, some are long and some are short. During the manufacturing, tentacles may be made to stretch or bend by increasing the density and thickness of the rubber film on certain part of tentacles, an air inflation port is provided at the end of a tentacle. The fifth movable unit 25 connects to the second driving device, in the present first embodiment, the second driving device is a small air pump, the air pump inflates the tentacles through a gas pipeline and drives tentacles to perform bending or stretching movements, although tentacles are also formed by the rubber film, the inside of the rubber film of tentacles is empty and sealed, which is different from that the rubber film just covers other parts of the surface, one or more tentacles correspond to one or more slender gasbags, when it starts to work, first, gas is filled by an air pump in order to make it inflate, since special processing, such as increasing density or thickness of the rubber film of some parts of tentacles, are performed during the manufacture, after tentacles are aerated and inflated, these parts will make tentacles deform or distort or stretch if aeration continues, suppose that rubber film of some parts is soft, rubber film of some parts is hard, when aeration continues, soft part will inflate, and hard part will not inflate relatively, again, suppose that rubber film of some parts are made originally to be curly, when aeration continues, these curly parts will stretch and get straighten, etc., then as long as the air pump continues to aerate through the gas pipeline and deflate, tentacles will deform or distort or stretch as if it is alive. In fact, one air pump may connect to multiple gas pipeline at the same time, and drive many groups of tentacles by aeration and deflation in turn, therefore, a control circuit may be used to control more than two groups of air pumps respectively to cooperate, in order to drive many groups of tentacles whose rubber film technology are different in different rhythms, so that movements of tentacles may be interlaced, lively and changeable, such design guarantees that tentacles take up a little space before stretching, reach a far place after stretching, and will not be damaged because of collision. Please refer to FIGS. 3(a)-3(c), which illustrate the front view, lateral view and perspective view of movable units in the first embodiment, in which other parts of a face are removed.

Figure 4A:
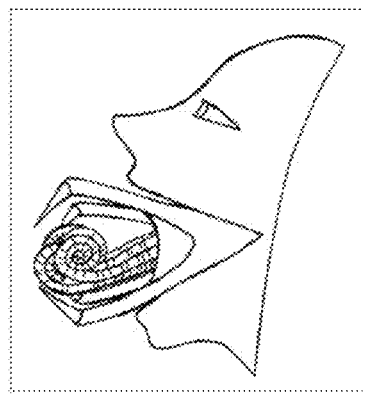
FIG. 4(a)-4(c) are the lateral effect diagrams and front effect diagram of crimped state and straight state of tentacles of the heteromorphic attachment film formed in the first embodiment of the present invention.
Figure 4B:
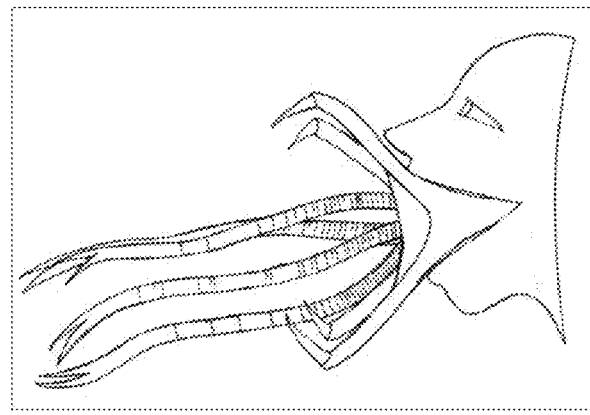
Figure 4C:
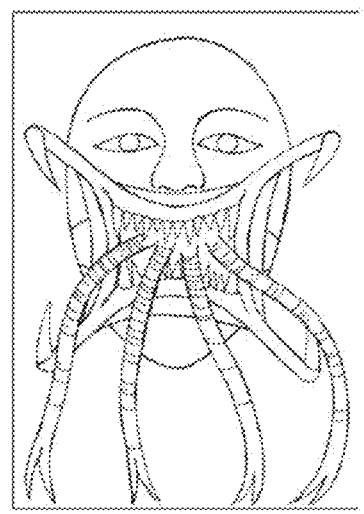
Figure 5A:
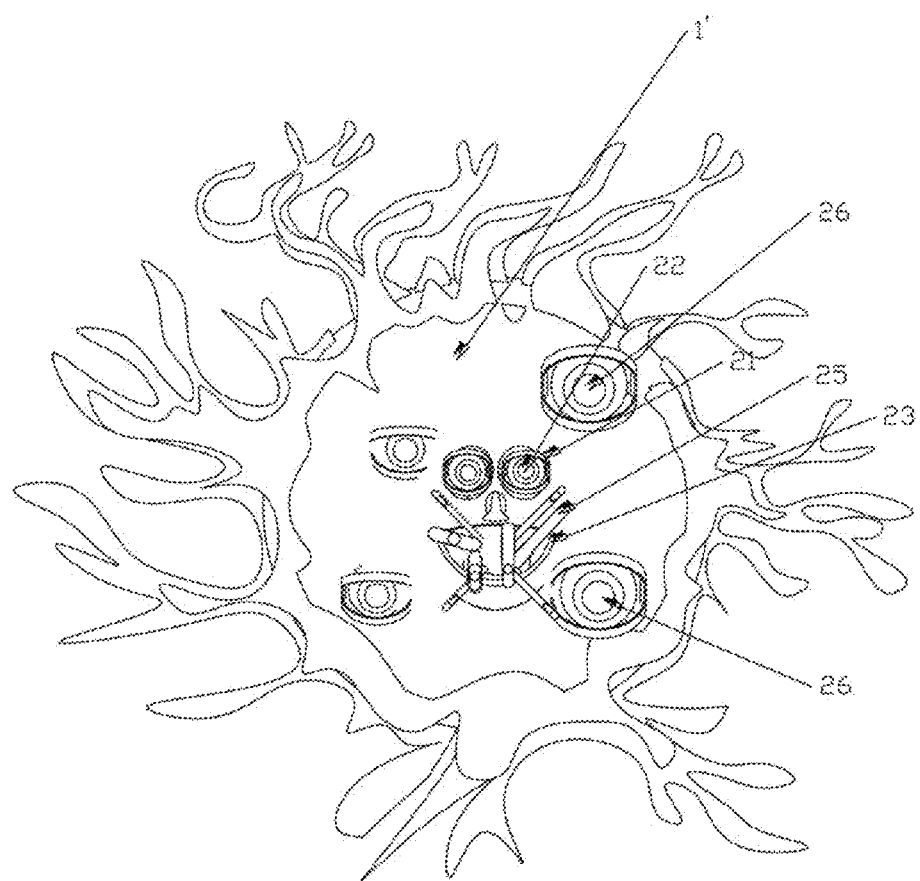
FIG. 5(a)-5(d) are the front view, top view, lateral view and perspective view of the structure of the heteromorphic attachment in the second embodiment of the present invention.
Figure 5B:
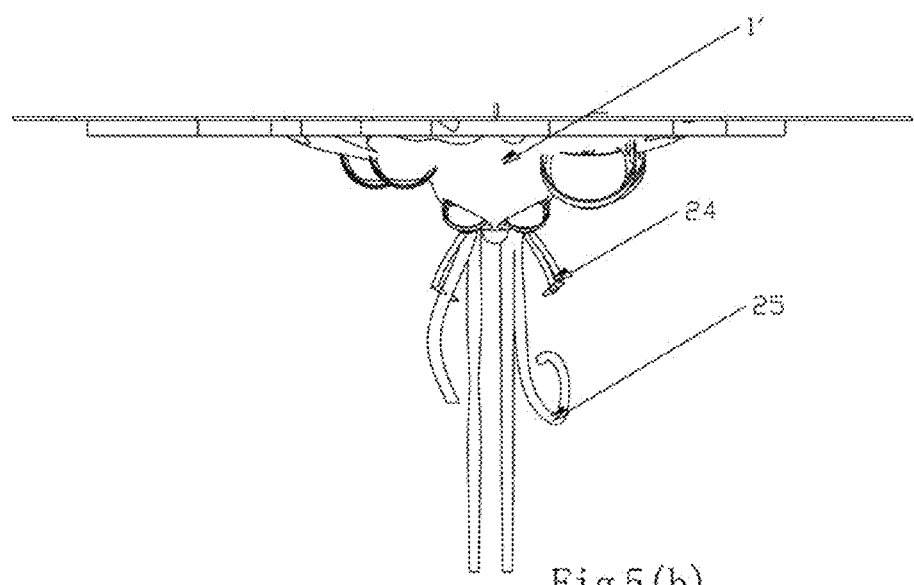
Figure 5C:
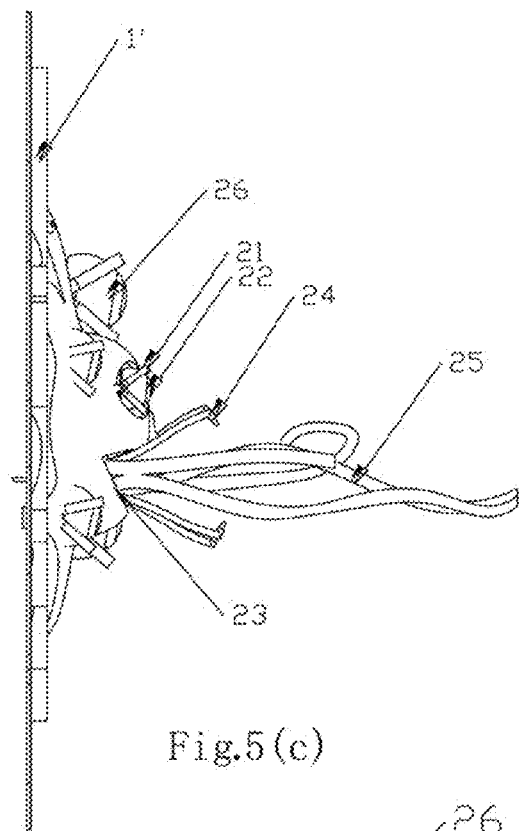
Figure 5D:
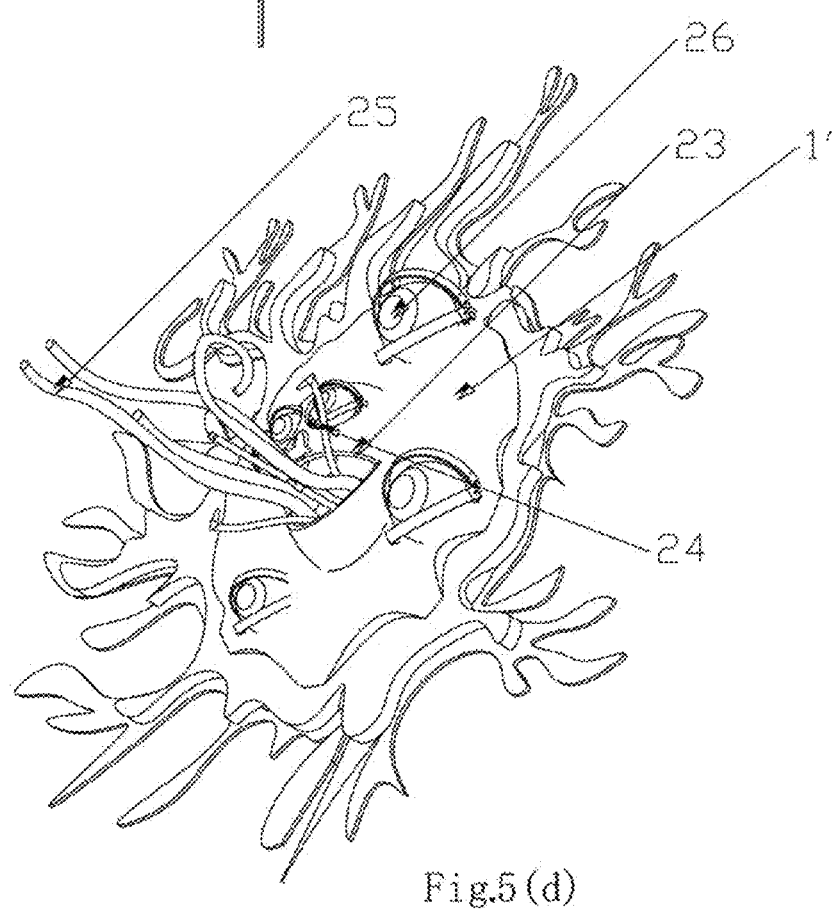
Figures 6A, 6B:
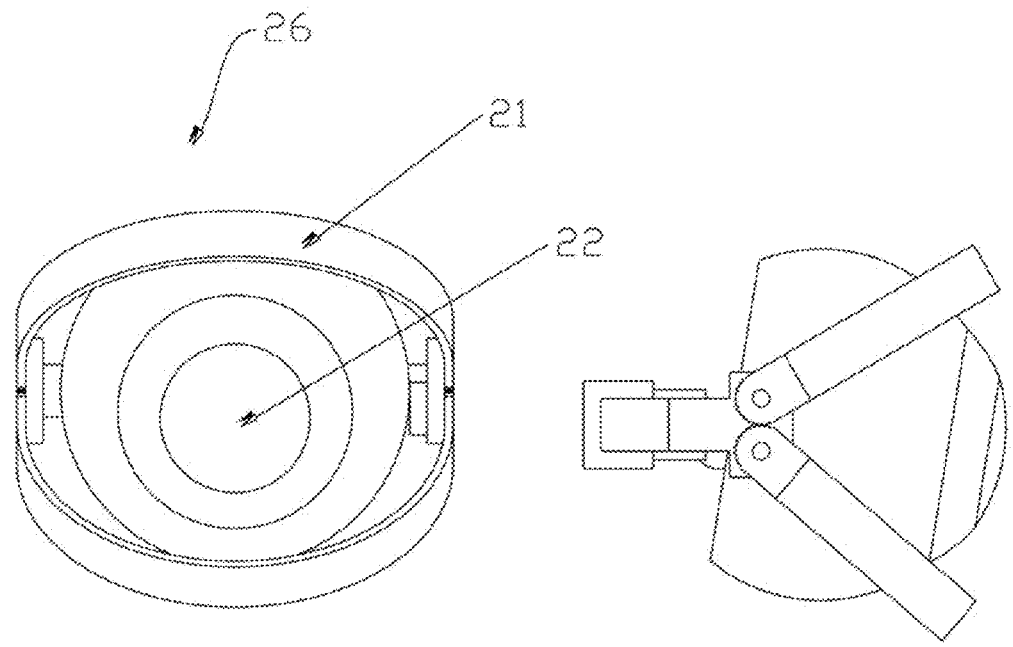
FIG. 6(a)-6(d) are the front view, top view, lateral view and perspective view of the monocular structure of the heteromorphic attachment in the second embodiment of the present invention.
Figures 6C, 6D:
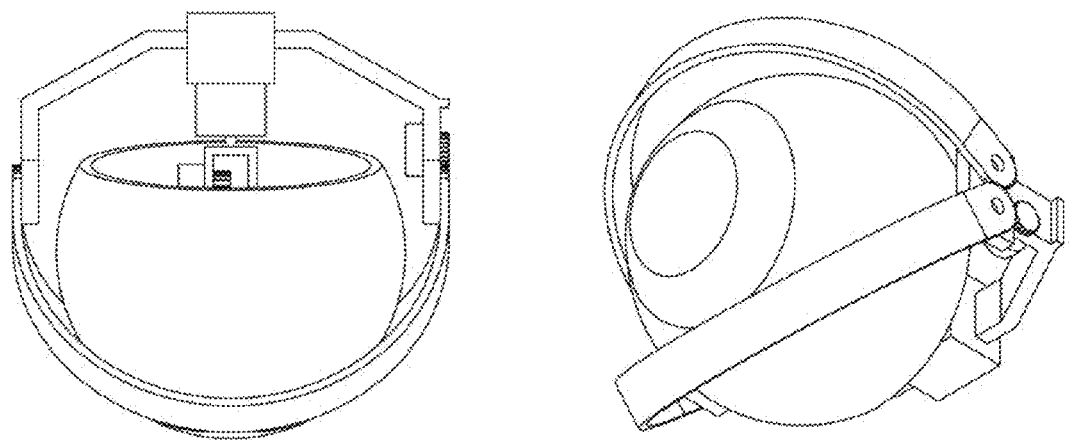

After the above setting is complete, a layer of rubber film is covered on the outer surface of the heteromorphic body 1, the surface rubber film is preferred to be formed by silica film which is similar to human skin in texture and color, odorless, non-toxic, and has excellent thermostability and stable chemical properties, so that the appearance of the heteromorphic attachment looks like a human face, in actual practice, the surface rubber film may also be formed to achieve other effect, such as an animal face, etc. Please refer to FIGS. 4(a)-4(c), which illustrate the effect schematic diagram of a human face covered by the surface rubber film in the present first embodiment, wherein FIG. 4(a) illustrates the effect when tentacles of the fifth movable unit curl and bend, FIG. 4(b) illustrates the effect when tentacles of the fifth movable unit get straighten. FIG. 4(c) illustrates the effect when the first to the fifth movable unit operate.

In addition, a transitional module is also provided on the heteromorphic attachment in order to install or place or attach the entire heteromorphic attachment on a game participant or a game facility, or in a game field. In the present first embodiment, the transitional module is a bandage or a belt bound on the staff.

In order to create a more realistic effect and atmosphere, a lighting effect module and a sound effect module may also be provided on the heteromorphic attachment. Wherein the lighting effect module may be a LED light of various colors or a fiber tube or an EL lamp, for example, LED lights of various colors shine or are mounted under translucent surface rubber film, especially in the eyes part, which make the heteromorphic attachment gleam or glitter, simulate the vitality and energy, increase the horror effect of the heteromorphic attachment, and represent the strong or weak vitality of the heteromorphic attachment. For example, red fiber tubes are provided on several locations of the heteromorphic attachment, such as in the eyeball, tear gland under the eyes, both sides of the mouth, etc., when the heteromorphic attachment is angry or has weak vitality, red fiber tubes are turned on to simulate the effect of blood streak and blooding, an El lamp may be cut into bloodshot mesh, and may simulate the bloodshot and blooding effect of tissues well after turned on, further, an EL lamp may create the fluorescent effect. The sound effect module may employ a loudspeaker and a microphone, cooperate with movements of respective movable units on the heteromorphic attachment, and play various pre-recorded sound effect. For example, when the eyes and mouth open, the heteromorphic attachment makes a horrible sound; when tentacles stretch, it makes a rustling sound, etc., which are not listed here, the horror and shock effect is thereby created in the game site.

Additionally, in order that the heteromorphic attachment may simulate the effect of attacking and being attacked, a laser transmitter and a laser receiver are provided on the heteromorphic attachment. Wherein the laser transmitter is used for aiming at a player in the game and transmitting a laser encoding signal as long range attacks, the transmitted laser pulse encoding signal hitting a laser receiver on the player means that the player is hurt successfully. The laser receiver is used for receiving the laser encoding signal transmitted by a laser gun of a player in the game, when the laser encoding signal is received, it means that the heteromorphic attachment is shot.

In order to make the heteromorphic attachment attack a player in the game closely, an infrared transmitting tube is also provided on the heteromorphic attachment, since the wavelengths of infrared ray fall into a certain range (i.e. 0.76-400 micrometers), therefore, the infrared transmitting tube whose divergence angle is large may use the infrared pulse encoding signal to attack close offensive players within a certain range at the same time.

A movable heteromorphic attachment (for example attached on the staff, making the staff simulate a monster) may be shot to death by a player using a laser gun, and may also attack a player using its own laser transmitter or infrared transmitting tube, staff playing a monster and attacking a player is in need of work, therefore, reward and punishment mechanism must be set up in order to increase the Initiative of staff, some are similar to the mechanisms that a certain number of players must be shot in the game and the more player are shot, the higher prize will be obtained, it is guaranteed that the staff are dedicated to the work, and thus all the players get fair challenge. However, for cost reasons, the number of players may be great, the number of movable heteromorphic attachment (monsters played by the staff) may not be so large, therefore, a heteromorphic attachment is generally configured to have very high amount of blood value and is difficult to shot, in this context, it is very necessary to provide a speed detection device on the heteromorphic attachment in order to restrict the heteromorphic attachment to move and attack under a maximum speed. The speed detection device may be realized using a vibration sensor or an acceleration sensor. Wherein the vibration sensor may detect the vibration frequency of the heteromorphic attachment, higher frequency means faster moving speed. The acceleration sensor may detect acceleration data output as the heteromorphic attachment moves, when moving speed of the heteromorphic attachment computed by the two methods exceeds a preset value, a control circuit will record and inform a remote control switchboard by a wireless device, and may warn using the sound effect module or lighting effect module, and stop the attacking function. The acceleration sensor is divided into an angular accelerometer and a linear accelerometer, the two acceleration sensors may compute the cumulative moving distance of the heteromorphic monster played by the staff, in addition to computing the moving speed of the heteromorphic attachment in real time, if the angular accelerometer is used, the total cumulative rotational angle may be computed, these data could be used as reference index of whether the staff are dedicated to work.

At least a human body sensor may be also provided on the heteromorphic attachment in order that the heteromorphic attachment attached on a game facility or in a game field may find a player that is approaching, in the present first embodiment, a miniature pyroelectric infrared sensor is used as the human body sensor, its controlling is simple and cost is low. When the human body sensor senses that a player approaches, a control circuit starts the driving device to drive multiple movable unit above to perform corresponding actions in accordance with the preset requirements.

In particular, when a player passes and is sensed by the human body sensor of the heteromorphic attachment, the control circuit starts the first and second driving devices to control the first to fifth movable units to perform corresponding actions, comprising: a. eyes on a giant face opens, eyeballs rotate by a motor and gaze at the location where a player is sensed and appears, like gazing at a person, posing strong pressure on the player; the mouth opens, and a variety of tentacles which are straight or curly and move automatically, stretch out of the mouth; b. a laser transmitter or an infrared transmitting tube transmits, simulating that the heteromorphic attachment attacks a player; c. a lighting effect module cooperates to make various lighting effect; d. a sound effect module plays all kinds of horror sounds that are pre-recorded.

The Second Embodiment

The present second embodiment illustrates another heteromorphic attachment used in a laser gunfight game of the present invention, please refer to FIGS. 5(a)-5(d), which illustrate the front view, top view, lateral view and perspective view of the heteromorphic attachment. The heteromorphic attachment in the present second embodiment may play a big boss in the game, i.e., a monster of ultimate challenge. Therefore, the heteromorphic attachment combines a number of heteromorphic attachments or movable units on a number of heteromorphic attachments, in particular, other components are added based on the heteromorphic attachment in the first embodiment. The differences between the second embodiment and the first embodiment are: shapes of the heteromorphic bodies are different, a movable unit on the heteromorphic body is added, and a human body sensor is added.

The heteromorphic attachment in the present second embodiment may attach in a game field, such as a wall, a corridor, a corner, etc. Wherein the heteromorphic body 1' is a giant root on which are multiple stretching tentacles similar to plant roots or rhizomes, the entire heteromorphic body 1' comprises a transitional module which is set behind the tentacles, the transitional module may be a variety of fasteners, such as a bandage, a ring, a hook, etc., the transitional modules may make the heteromorphic body fix on the wall or corridor of the game field firmly, the entire heteromorphic body 1' employ elastic material such as silica gel, latex, Vinyl, and rubber, to form the surface of the heteromorphic body 1', that is, the surface rubber film.

A variety of movable units are provided on the heteromorphic body 1', comprising the human face structure and all the movable units in the first embodiment, which are not discussed here. Moreover, a number of other movable units are provided, i.e., the sixth movable unit 26, shown as a number of single eyes of different sizes, the structure of the single eye is basically consistent with the eyes on the face structure in the first embodiment, please refer to FIGS. 6(a)-6(d), which illustrate the front view, lateral view, top view and perspective view of the single eye. These single eyes are under the control of the third driving device, their eyelids may open or close, or blink constantly, in addition, eyeballs in the eyes may rotate constantly or gaze at the position where a player is, creating the tensive and aggressive atmosphere. In the present second embodiment, the third driving device employs a miniature oil pump to drive an oil cylinder to provide driving force, the driving force generated by the process of the oil pump driving the oil cylinder is very strong.

Figure 7:
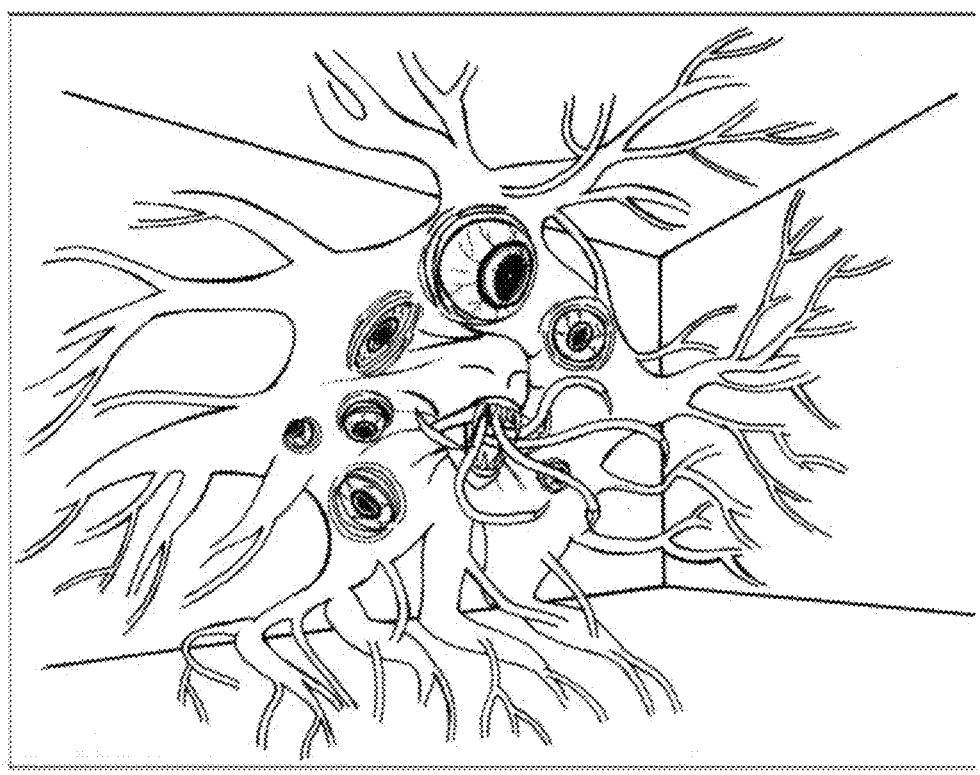
FIG. 7 is an effect diagram of the heteromorphic attachment film formed in the second embodiment of the present invention.

After the above setting is complete, a layer of rubber film is covered on the outer surface of the heteromorphic body 1', silica gel is preferred to form the surface rubber film, which makes the appearance of the heteromorphic attachment look like three-dimensional, and creates the horror effect. Please refer to FIG. 7, which illustrates the effect schematic diagram of the heteromorphic attachment covered by surface rubber film in the present second embodiment, wherein the heteromorphic attachment attaches on the wall of a building.

Moreover, in the present second embodiment, an ultrasonic probe is used as the human body sensor, since the heteromorphic attachment is mounted in a building of the game field, a number of human body sensor may be provided on the heteromorphic attachment and its vicinity, in order that a passing player is sensed more accurately.

Therefore, in the present second embodiment, when a player passes and is sensed by the human body sensor of the heteromorphic attachment, the control circuit starts the driving devices to control the first to sixth movable units to perform corresponding actions, comprising: a. eyes on a giant face open, eyeballs rotate by a motor and gaze at the location where a player is sensed and appears, like gazing at a person, posing strong pressure on the player; the mouth opens, and a variety of tentacles which are straight or curly and move automatically, stretch out of the mouth; b. at the same time, a number of single eyes open, the eyeballs inside rotate to the location where a player appears and gaze at the player, posing strong pressure on the player; c. a laser transmitter or an infrared transmitting tube transmits a encoding signal, simulating that the heteromorphic attachment attacks a player; d. a lighting effect module cooperates to make various lighting effect; e. a sound effect module plays all kinds of horror sounds that are pre-recorded.

The Third Embodiment

Figure 8A:
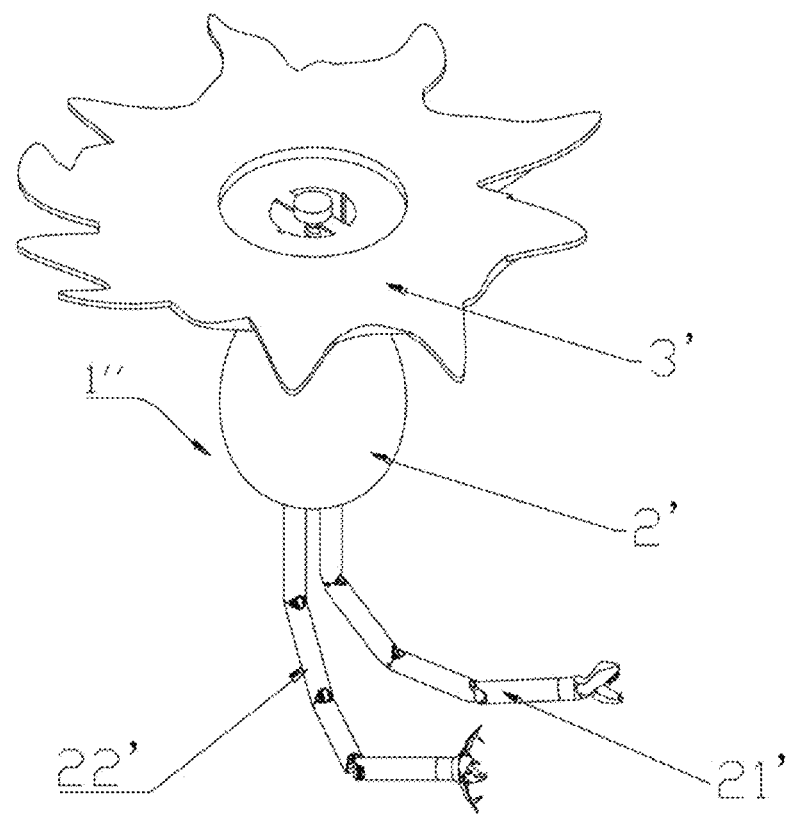
FIG. 8(a)-8(b) are the front view, top view and perspective view of the structure of the heteromorphic attachment in the third embodiment of the present invention.
Figure 8B:
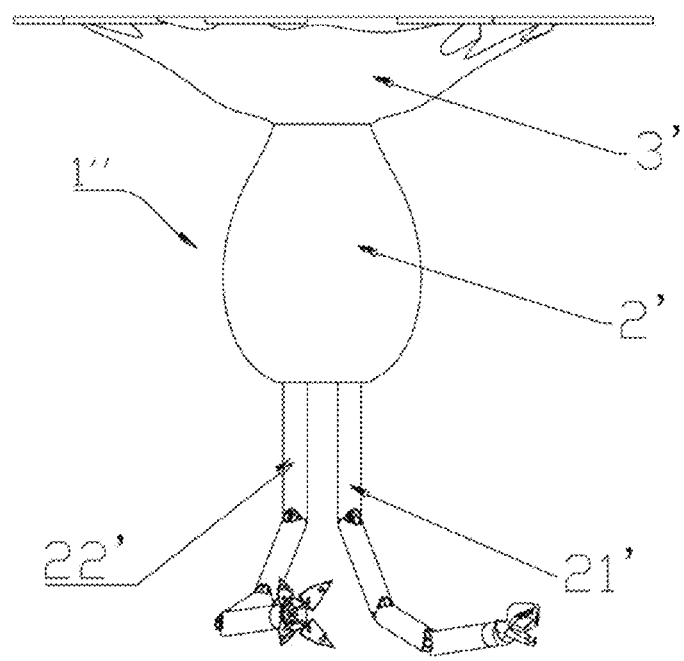
Figure 9A:
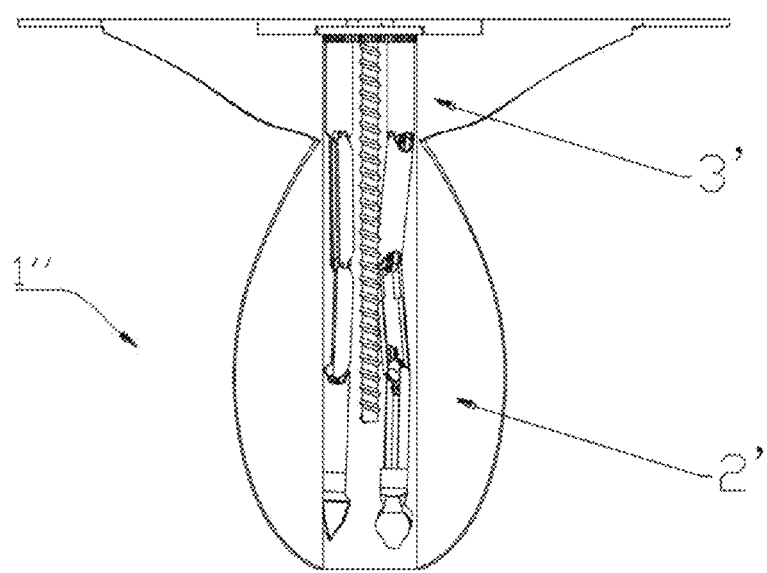
FIG. 9(a)-9(d) are the sectional schematic diagrams of the front view and perspective view of the heteromorphic attachment before work and on work in the third embodiment of the present invention.
Figure 9B:
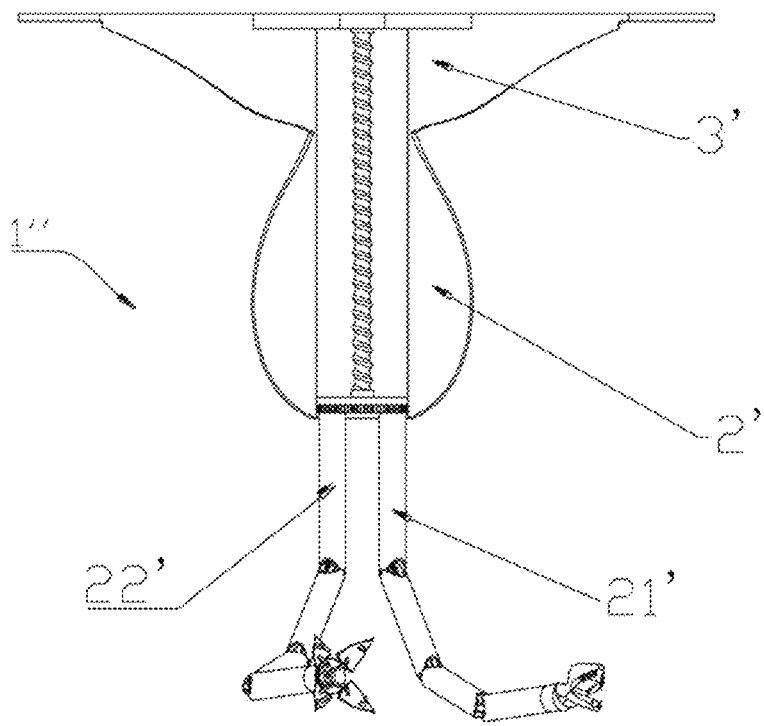
Figure 9C:
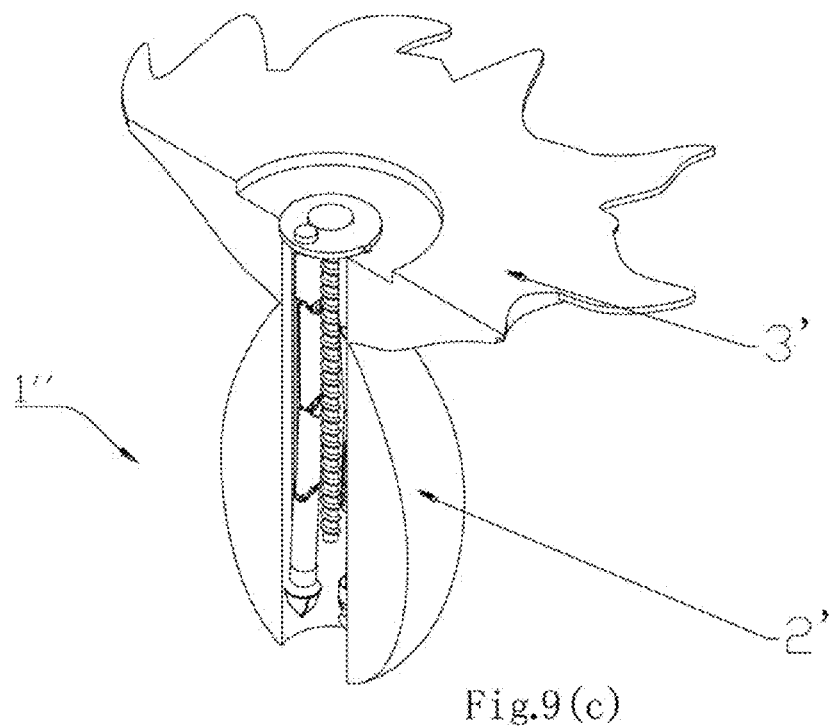
Figure 9D:
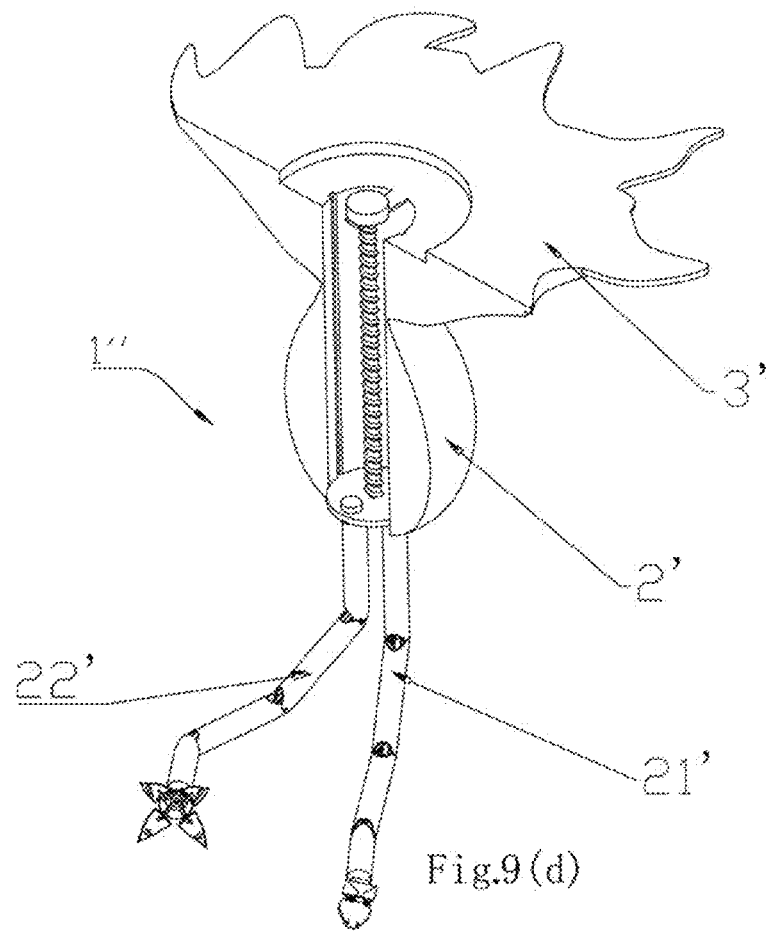

The present third embodiment illustrates another heteromorphic attachment used in a laser gunfight game of the present invention, please refer to FIGS. 8(a)-8(b). The third embodiment is different from the second embodiment and the first embodiment, the differences comprise: shapes of the heteromorphic bodies are different, movable units on the heteromorphic body are different.

In the present third embodiment, the heteromorphic attachment may attach in a game field, such as on a roof, the end of a corridor, the floor of the game building, etc. A root 3' is provided on top of the heteromorphic body 1", a transitional module (ring or hook) is provided on top of the root 3', and used for fixing the heteromorphic attachment on the floor, wall or ceiling of the game field firmly. The other end of the root 3' connects to a body 2', the body 2' is shaped like an egg, and may be made to be different sizes or shapes according to need of the game. The entire heteromorphic body 1" all employ elastic material such as silica gel, latex, Vinyl, and rubber, forming the surface rubber film and comprising a variety of mechanical components and circuit elements, which make the appearance look like the modeling set in the game. Please refer to FIG. 8, which illustrates the effect schematic diagram of the heteromorphic attachment covered by surface rubber film in the present third embodiment, wherein the heteromorphic attachment attaches on the ceiling of a building.

Two movable units are provided in the egg shape of the body '2 of the heteromorphic body 1", comprising: the first movable unit 21' showing as a snake head and snake body, and the second movable unit 22' showing as a claw. As shown by the sectional view of the egg body in the FIGS. 9(a)-9(d), the first movable unit 21' and the second movable unit 22' locate inside the egg of body 2' when they don't work; when they work, the first movable unit 21' and the second movable unit 22' stretch out of the egg of body 2' under the control of the driving device, the snake head and snake body may rotate or sway up and down, left and right, the mouth on the snake head opens and sharp teeth appear, creating the horror atmosphere. In the present third embodiment, the driving device employs a motor to drive a conveyor belt to make linear movement along a spiral track.

When a player is sensed to pass by the human body sensor of the heteromorphic attachment in the third embodiment, the control circuit starts the driving device to control the first movable unit and the second movable unit to perform corresponding actions, comprising: a. the snake head and claw stretch out of the egg body, and sway or shake towards the location where a player appears, creating the feeling of attacking the player, b. a laser transmitter or an infrared transmitting tube transmits an encoding signal, simulating that the heteromorphic attachment attacks a player; c. a lighting effect module cooperates to make various lighting effect; d. a sound effect module plays all kinds of horror sounds that are pre-recorded.

The Fourth Embodiment

Figure 10:
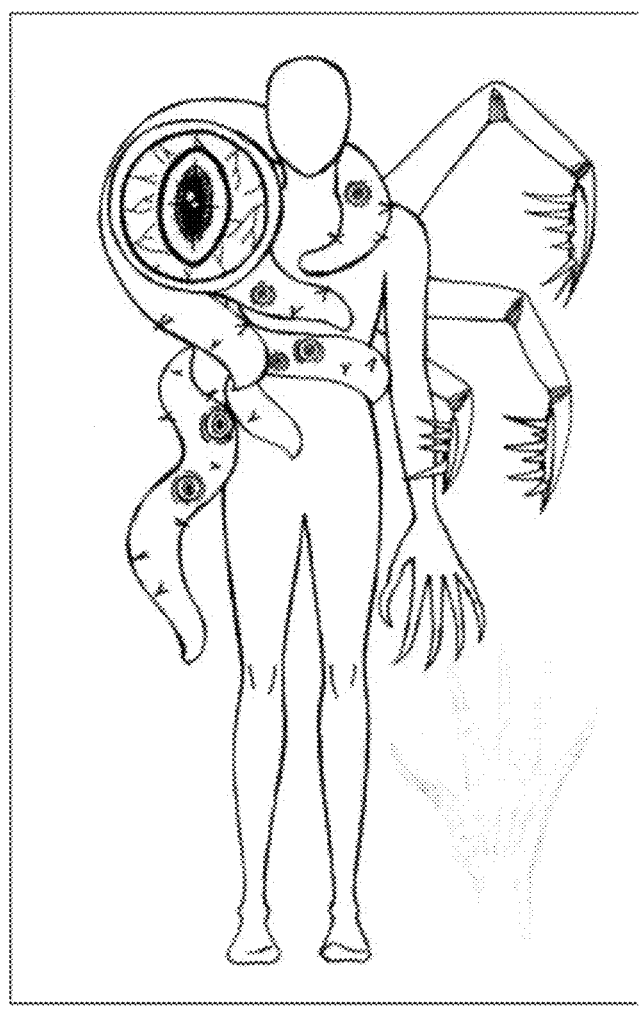
FIG. 10 is a using effect diagram of the heteromorphic attachment in the fourth embodiment of the present invention.

The present fourth embodiment illustrates another heteromorphic attachment used in a laser gunfight game of the present invention, please refer to FIG. 10, which illustrates an effect diagram of the heteromorphic attachment attaching on the staff. The fourth embodiment is different from the first to third embodiments, the differences comprise: shapes of the heteromorphic bodies are different, movable units on the heteromorphic bodies are different, and another movable unit which may drop is also provided on the heteromorphic body.

In the present fourth embodiment, the heteromorphic attachment attaches on the staff, wherein the heteromorphic body 1" is a giant eyeball, the heteromorphic body 1" is formed by elastic material such as silica gel, latex, Vinyl, and rubber, etc., becoming the surface rubber film. The first movable unit 21" is provided on the heteromorphic body 1", which makes the giant eye rotate under the control of the driving device and the eyelid open.

The heteromorphic body 1" also connects to the second movable unit 22". The second movable unit 22" is shown as a number of thick flexible tentacles, the tentacles may perform actions such as squirming, swinging, and swaying, etc. around the heteromorphic body 1" under the driving of the driving device. Moreover, a number of the third movable units 23" are also provided on the tentacles of the second movable unit 22", the third movable units 23" are shown as movable eyeballs of different sizes, under the control of the driving device, a number of eyeballs may rotate constantly, and eyelids of the eyeballs open or close, creating the tensive and aggressive atmosphere.

In the present embodiment, gloves shaped as claws are worn by left hands of the staff, the glove is covered by the surface rubber film on which a laser transmitter and an infrared transmitting tube are provided as means for attacking a player. The right hand of the staff is wrapped by the entire heteromorphic attachment, the right hand is hidden in the giant tentacle, the right hand may hold an effect controller at this time, the effect controller is preferred to connect to the control circuit of the heteromorphic attachment using wired connections in the present embodiment, circuits may be hidden in the giant tentacles completely, of course, a wireless module may be provided on the effect controller which may control the control circuit of the heteromorphic attachment on one's body using wireless connection which is more convenient.

Figure 11A:
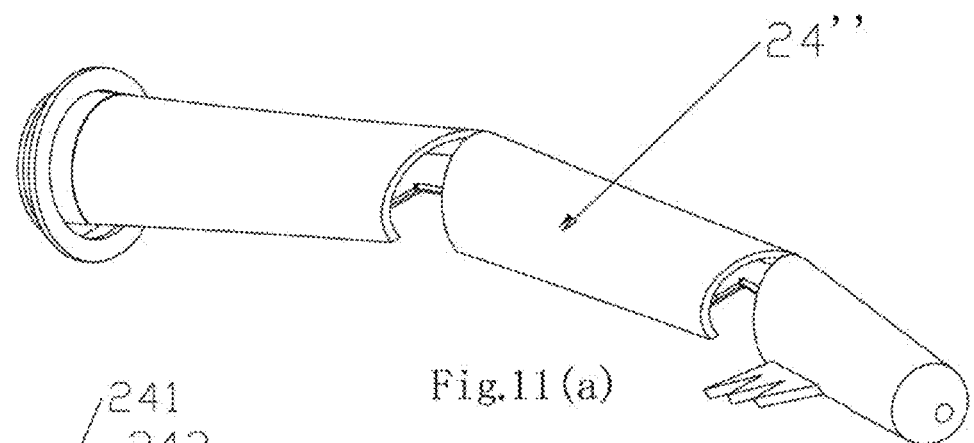
FIG. 11(a) is an outline diagram of an auto dropping device of the heteromorphic attachment in the fourth embodiment of the present invention.
Figure 11B:
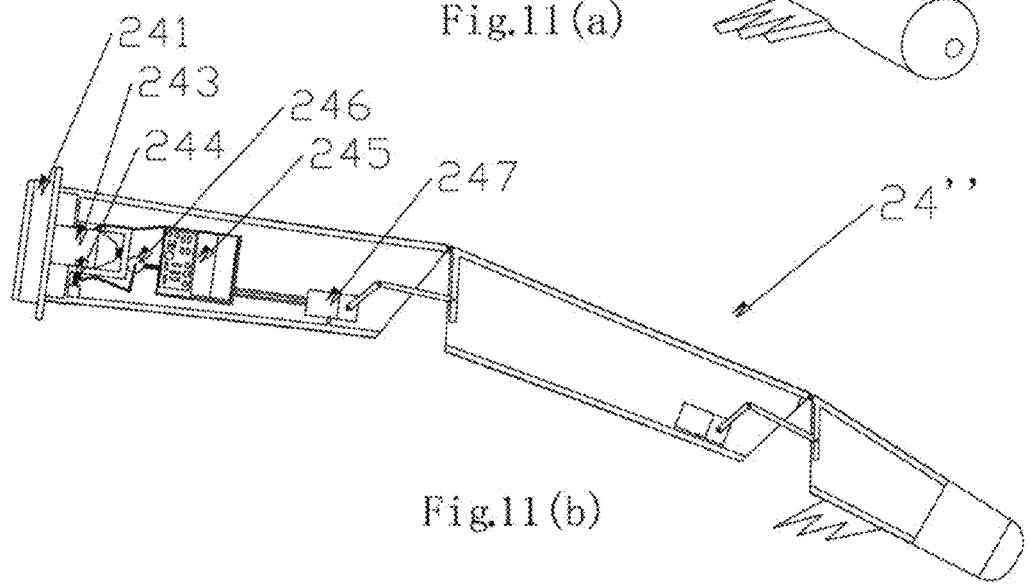
FIG. 11(b) is a sectional diagram of the auto dropping device in the FIG. 11(a) before it drops.
Figure 11C:
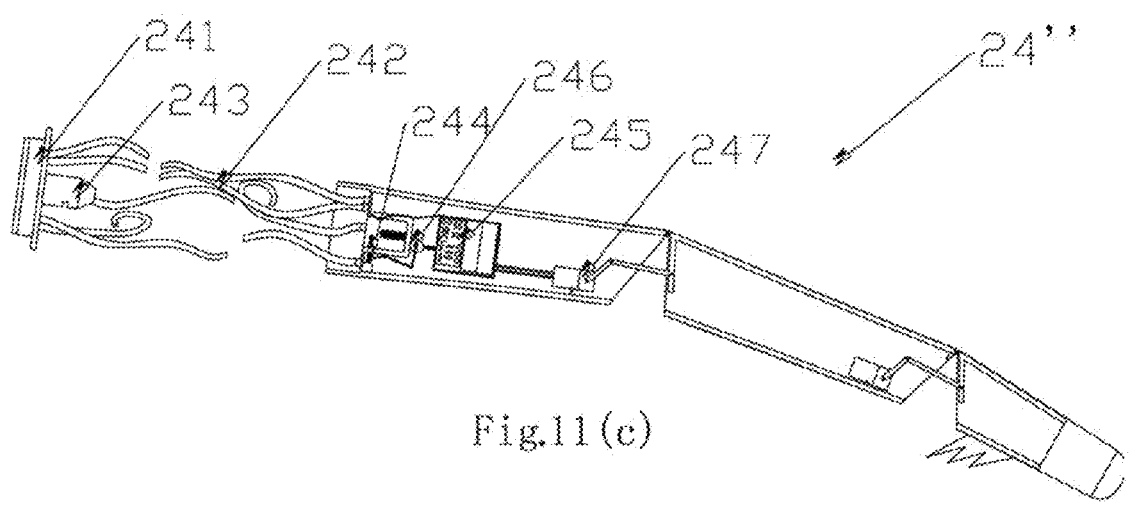
FIG. 11(c) is a sectional diagram of the auto dropping device in the FIG. 11(a) when it is dropping.

The heteromorphic body 1" further connects to the fourth movable unit which may auto drop, referred to as an auto drop device 24", and its appearance is like a number of arms or weird limbs growing out of the heteromorphic attachment. The auto drop device is also covered by the surface rubber film, that is, formed by elastic material such as silica gel, latex, Vinyl, and rubber, etc., in the present fourth embodiment, each limb of the auto drop device consists of three limb segments, there is joint portion between two segments, and the limb segment may swing with respect to the joint portion. The internal structure of the auto drop device may be referred to FIGS. 11(a)-11(c), which illustrate the appearance view, the internal sectional view and schematic diagram of dropping of the dropping body of an auto drop device, respectively. As shown by FIGS. 11(b) and 11(c), several tentacles 242 are provided in the left end cover 241 of the dropping body snugly, a bump 243 is arranged on the left end cover 241, a locking position and a circuit are arranged on the bump 243, at the same time, the bump 243 connects to a spring 244, its circuit portion connects to the control circuit 245 electrically, the control circuit 245 may drive a motor 246 to operate in order to make the spring 244 contract, making the locking position loose, and thus the left end cover 241 and a limb of a dropping body separate. The control circuit 245 further connects to another motor 247 which controls joint portions to operate. These auto drop devices are mounted on the heteromorphic attachment before a game starts, after it is attacked a certain times by players or a certain damage value is reached, these auto drop devices may drop automatically, when the control circuit 245 receives the signal of disconnecting a limb of an auto drop device, the control circuit 245 will drive the motor 246 to separate the left end cover 241 and the heteromorphic attachment, at the same time, several tentacles 242 which are hidden in the left end cover are popped out of the left end cover 241, and these tentacles 242 are driven to swing wildly, and the effect of the auto drop device struggling and swinging when dropping is thus created.

In the present fourth embodiment, the driving device of an auto drop device employs a number of motors and electromagnets to drive a gear or shaft to rotate or output linear power, driving or getting rid of a dropping unit. In other embodiments, it is also possible to employ a small air pump to drive an air cylinder to provide driving force or a miniature oil pump to drive an oil cylinder to provide driving force. The function of the driving device is to make the locking position loose and push an effect module (a number of tentacles) out of a dropping body and swing by the instant of dropping automatically, and drive the auto drop device to stretch and swing by itself at the same time; when an auto drop device is recycled to use, the effect module (a number of tentacles) will be stuffed in the end cover of a dropping body under the control of the driving device, the locking position is clamped, and the auto drop device may be recycled.

Furthermore, an omnibearing vibration sensor (an omnibearing vibration switch) and an infrared transmitting tube are further provided on an auto drop device, they will be started when the auto drop device drops on the ground, when the auto drop device on the ground is touched by a player, the omnibearing vibration sensor will sense that and control the infrared transmitting tube to emit infrared ray which prevents players from touching or treading these auto drop devices. In order to increase the horror atmosphere of a game, a terrible and bloody scene setting may be created before the game, that is, an auto drop device is made like a mutilated limb of a monster or human, which is put somewhere such as on the ground in the game scene. Arrangement of an omnibearing vibration switch may prevent players from treading or kicking the dropping module excessively. A lighting effect module and a sound effect module may further be provided on an auto drop device, so that relevant effect will be created when or after the auto drop device drops.

Figure 12:
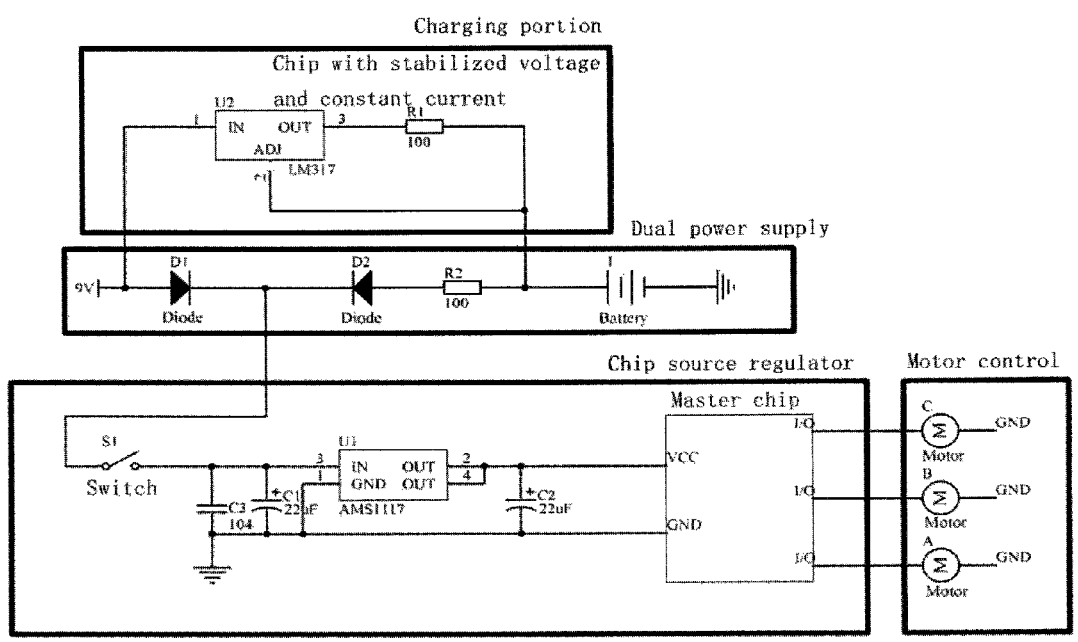
FIG. 12 is a circuit diagram of the power source part in the auto dropping device of the heteromorphic attachment in the fourth embodiment of the present invention.

In the present fourth embodiment, an auto drop device employs dual power supply, please refer to FIG. 12 for its circuit schematic. Such designed dual power supply circuit may charge power source 2 using power source 1, and power source 2 will not be used after the auto drop devices drops and is immobile (when the omnibearing vibration switch does not vibrate). The auto drop device may be arranged on any heteromorphic attachment.

Additionally, as another embodiment of an auto drop device, the structure may be a little different, which shows on a connecting unit. Please refer to FIGS. 13(a)-13(b), which illustrate an internal sectional view of a dropping limb of an auto drop device, and a schematic diagram of dropping of the dropping limb, respectively.

Figure 13:
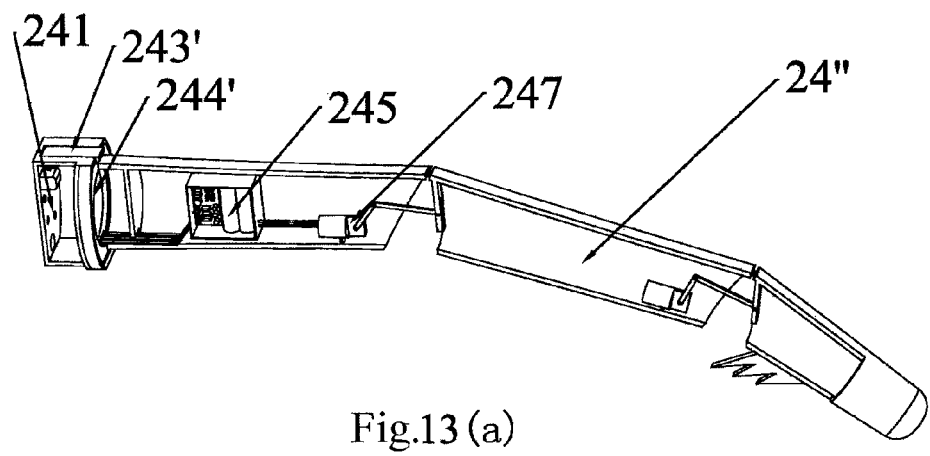
FIG. 13(a) is a sectional diagram of the auto dropping device in another embodiment of the present invention before it drops.
FIG. 13(b) is a sectional diagram of the auto dropping device in the FIG. 13(a) when it is dropping.
Figure 13:
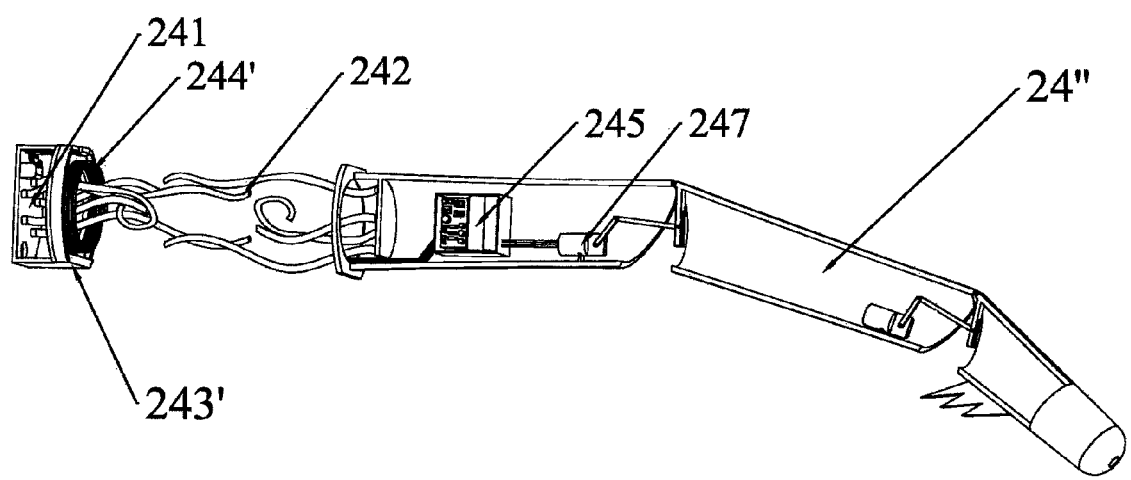

As shown by FIGS. 13(a) and 13(b), several tentacles 242 are provided in the left end cover 241 of a dropping body snugly, a locking position 243' and a copper circuit are provided on both sides of the left end cover 241 respectively, the copper circuit connects to the control circuit 245, and is used for charging the power source of a dropping body and sending dropping command to the control circuit 245 by the heteromorphic attachment. At the same time, a ring of spring 244' is further provided inside the left end cover 241, the spring 244' connects to the control circuit 245 electrically by copper wire and copper sheet, the control circuit 245 may drive a motor 246 to operate in order to make the locking position under the end cover 241 loose, at this time, elastic force of the spring 244' could be released, the left end cover 241 and the heteromorphic attachment separate quickly, and the effect of a monster's limbs being attacked and bombed to break is thus simulated. Now, the control circuit 245 further connects to another motor 247 which controls joint portions to operate, controlling all the joints of the dropping body to move quickly, which simulates a monster with limbs swinging wildly, the control circuit 245 further controls the driving device to extend and swing the effect module, for example, a number of flexible tentacles stretch, shake, swing and take back, etc., simulating a variety of weird tissues having exuberant vitality in the heteromorphic limb of a monster dropped on the ground. The control circuit 245 further provides that after a dropping body drops, a vibration sensor starts to detect signal of vibration 1 minute later, in order to emit infrared encoding damaging signal.

The Fifth Embodiment

Figure 14:
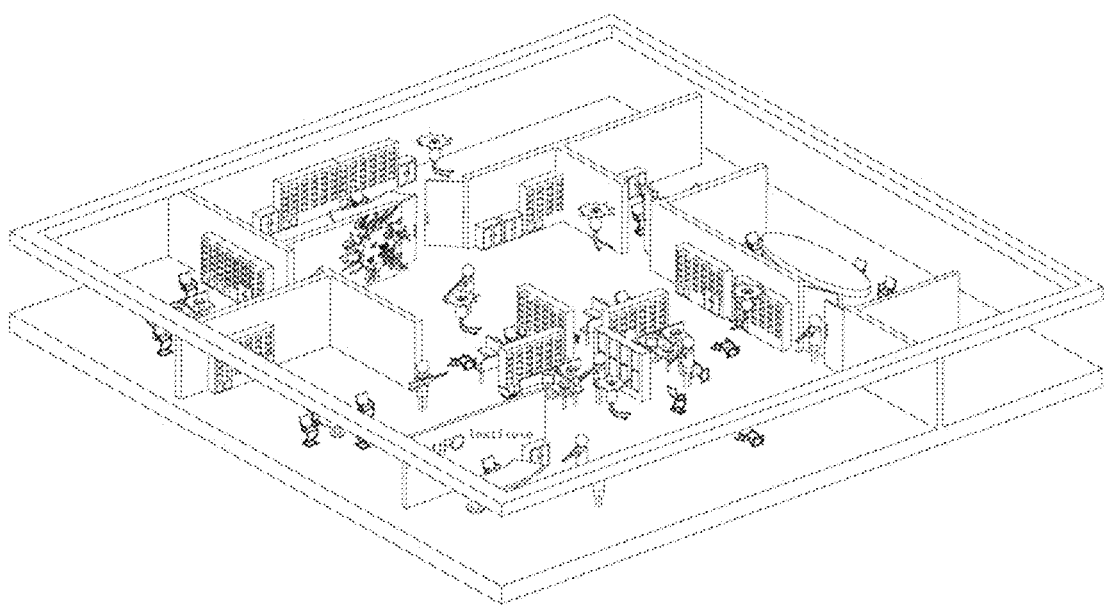
FIG. 14 is an effect diagram of the system having a heteromorphic attachment in the fifth embodiment of the present invention.

The present fifth embodiment illustrates a schematic diagram when a system having a heteromorphic attachment is applied (as shown in FIG. 14). The game field is selected to be in a building, such as an office, there are five heteromorphic attachments described in the third embodiment and one heteromorphic attachment (big boss) described in the second embodiment in the system, refer to the above for the structure which may not be discussed here. Of course, in an actual game setting, there may be any number of heteromorphic attachments described in the first to fourth embodiments in the system, and any number of transformed or modified heteromorphic attachments described in the first to fourth embodiments may be provided without departing from the scope of the present invention. More various heteromorphic attachments may be arranged in the realistic game scene, the staff make heteromorphic attachments bound on themselves and play monsters to attack players everywhere, and players can attempt the ultimate experience of challenging a variety of monsters alone or in a team which only exist in the movies, computers and online games. Different from the laser field sport in the current market, such a game scene needs large investment arrangement, and is suitable for establishing in large scale theme parks and acts as one of the entertainment projects, the number of visitors is very large during the holidays, plenty of visitors will enter the game scene and play. In order that the system can fit for the case and operate normally, the system further comprises equipment used by players, which are a combat suit and a laser gun. A laser receiver, an infrared receiver and a control circuit are provided on the combat suit of a player, wherein the laser receiver is used for receiving the laser pulse encoding signal transmitted by a laser transmitter in a heteromorphic attachment, which acts as being attacked remotely by the heteromorphic attachment; the control circuit is used for controlling all the components on the combat suit of a player. In addition to the laser receiver and the control circuit, an infrared receiving tube is further provided on the combat suit of a player, and used for receiving an infrared pulse encoding signal transmitted by an infrared transmitting tube on the heteromorphic attachment, which acts as being attacked closely by the heteromorphic attachment. Wherein the laser gun is used for transmitting a laser pulse encoding signal, simulating a player attacking a heteromorphic attachment, a laser receiver and an infrared receiving tube are further provided on the laser gun and used for receiving the attack made by a laser transmitter and an infrared transmitter on a heteromorphic attachment in the game scene, this setting makes the staff arm players quickly and prepare for the game quickly, players may enter the game field and play only with a laser gun in hand. In fact, a combat suit is worn by players constantly, during the holidays when there are a large number of players, it is impossible to clean the combat suit in time, it is true that combat suits wear and tear quickly, and the biggest problem is that it is sweaty, smelly and offensive. Moreover, most of players in a large scale theme part are children, if combat suits are provided, several models of different sizes must be made in order to allow the physical difference between adults and children, which will increase the cost greatly, therefore, adding multiple laser receivers and infrared receiving tubes on the laser gun may save a tedious and stupid step in which players put on the combat suit, it reduces workload of the staff, saves waiting time of players, and reduces the capital investment for equipment production and maintenance. An auto drop device in the heteromorphic attachment in the fourth embodiment is provided in the system, when the auto drop device is hit and drops on the ground, an infrared receiving tube provided on the combat suit or the laser gun of a player may receive the infrared pulse encoding signal transmitted by an infrared transmitting tube of the auto drop device, being attacked by the auto drop device.

In order that staff in the remote control center know the situation of the game site in real time and notify relevant data in time, a remote control switchboard is further provided in the system, comprising a wireless module and a control circuit, the wireless module is used for communicating with all the wireless devices in the game: and the control circuit controls all the components of the remote control switchboard. Correspondingly, a wireless module needs to be arranged on a number of heteromorphic attachments and is used for exchanging information with the remote control switch board, comprising control information, combat information (for example, which player is hit or extinguished), and the remote control switchboard will score. When a heteromorphic attachment is mounted on a building, its various actions may also be controlled by the remote control switchboard through the wireless module.

Furthermore, in order that staff can control actions and effects of a heteromorphic attachment in time, an effect controller may further be provided, the effect controller connects to a heteromorphic attachment through wired connection or wireless communication. The staff may control a heteromorphic attachment to perform corresponding actions, make pre-recorded sounds, present special light effects, and transmit laser or infrared encoding signal by operating control buttons. Especially when a heteromorphic attachment is arranged on the staff (as described in the fourth embodiment), the staff may adjust the combat status of a heteromorphic attachment in time, increase a game's battle effect, and create a more complex atmosphere by an effect controller in hand according to the combat situation on site.

In addition, in order to further perfect the system and guarantee the game's fairness, an imaging device may be provided on a variety of heteromorphic attachments, including the heteromorphic attachment bound on the staff, for example, it may be mounted on the front clothes or the hat on the head of the staff. The imaging device may employ an existing camera and a memory device inside such as a SD card which is used for taking various actions and expressions of players as souvenirs, or taking and proofing cheating actions of players for fairness, or acting as evidences of identifying responsible parties when accidental collisions happen to players. Further, an imaging device is mounted on a heteromorphic attachment fixed in a building field, the video pictures taken in time are input in the control circuit, players moving within the monitoring range will be detected roughly after programs, such as video monitoring motion capturing and image recognition, are installed in the control circuit, then, the control circuit may control the driving device to perform a variety of movable units' actions, control a laser transmitter or an infrared transmitting tube on a heteromorphic attachment to attack, and control the lighting effect module and sound effect module to operate according to preset rules.

In the present invention, the heteromorphic attachment used in a laser gunfight game and the surface rubber film of an auto drop device may be customized according to players' ages, the above embodiment are aimed at adult players, and thus they are provided horribly. If minor group of players are targeted, the heteromorphic attachment may be made to be cartoon characters, animals, Q version of monster appearances.

Specific embodiments listed in the present invention are only part preferred embodiments of the various forms in the present invention, various combinations and variations based on the above structures are intended to be covered by the present invention. Technical solutions based on the present invention, technical spirit complying with the present invention, and implementations that can be achieved by a person of ordinary skill without creative work all fall into the scope of protection of the present invention.

What is claimed:

1. A heteromorphic attachment used in a laser gunfight game, comprising: a heteromorphic body, at least one movable unit located on the heteromorphic body or connected to the heteromorphic body, a driving device for driving the at least one movable unit to operate, and a control circuit, wherein
    the heteromorphic body and at least one movable unit are formed by a surface rubber film, and simulate a creature having at least one moving body part,
    a laser receiver is provided on the heteromorphic attachment, and used for receiving a laser encoding signal in the game,
    a laser transmitter and/or an infrared transmitting tube is provided on the heteromorphic attachment, and used for transmitting a laser encoding signal and/or an infrared encoding signal, and
    at least one human body sensor is provided on the heteromorphic attachment, when a game participant is sensed to approach, the control circuit operates the driving device to drive the at least one movable unit.

2. The heteromorphic attachment according to claim 1, wherein a transitional module is also provided on the heteromorphic attachment, and used for placing or attaching the heteromorphic attachment on a game participant or a game facility, or in a game field.

3. The heteromorphic attachment according to claim 1, wherein a lighting effect module and/or a sound effect module is also provided on the heteromorphic attachment, and wherein the lighting effect module may be a LED light or a fiber tube or an EL lamp, of various colors; the sound effect module may be a loudspeaker and/or a microphone.

4. The heteromorphic attachment according to claim 1, wherein an auto dropping device is also connected to the heteromorphic attachment, and the auto dropping device comprises a dropping body, a control circuit provided in the dropping body, a driving device connected to the control circuit, and a connecting unit provided on an end of the dropping body and used for connecting to another body, the connecting unit connects to the driving device, and the driving device drives the connecting unit to disconnect with the heteromorphic attachment under the control of the control circuit.

5. The heteromorphic attachment according to claim 1, wherein the driving device employs a motor or an electromagnet to drive gears to make linear or shaft movement, or a small air pump to drive an air cylinder to move, or a miniature oil pump to drive an oil cylinder to move.

6. The heteromorphic attachment according to claim 4, wherein the driving device employs a motor or an electromagnet to drive gears to make linear or shaft movement, or a small air pump to drive an air cylinder to move, or a miniature oil pump to drive an oil cylinder to move.

7. The heteromorphic attachment according to claim 4, wherein the connecting unit specifically comprises an end cover and a locking position, the end cover connects to the heteromorphic attachment, the locking position is provided on the end cover and connects to the driving device, the driving device connects to the control circuit, the control circuit controls the driving device to operate, making the locking position loose, so that the end cover is disconnected with the heteromorphic attachment.

8. The heteromorphic attachment according to claim 7, wherein at least one spring is also provided in the connecting unit, the spring connects to the locking position in order to control the locking position to restore, or the spring is provided on the end cover, when the end cover and the heteromorphic attachment disconnect with each other, the dropping body is popped up by the elastic force of the spring.

9. The heteromorphic attachment according to claim 7, wherein an effect module is also provided in the connecting unit, the effect module extends from the connecting unit and moves under the control of the driving device, and the effect module is embodied as a plurality of movable tentacles.

10. The heteromorphic attachment according to claim 4, wherein an omnibearing vibration sensor for detecting the vibration frequency and an infrared transmitting tube for close large scale attack are provided on the auto dropping device, the infrared transmitting tube is controlled to transmit an infrared signal when vibration is detected.

11. The heteromorphic attachment according to claim 4, wherein a lighting effect module and/or a sound effect module is also provided on the auto dropping device, and wherein the lighting effect module may be a LED light of various colors or a fiber tube or an EL lamp; the sound effect module may be a loudspeaker and/or a microphone.

12. The heteromorphic attachment according to claim 1, wherein a speed detection device is also provided on the heteromorphic attachment, the speed detection device is embodied as a vibration sensor or an acceleration sensor.

13. The heteromorphic attachment according to claim 1, wherein a wireless device for transmitting and receiving signals wirelessly is also provided on the heteromorphic attachment.

14. A system having a heteromorphic attachment, comprising at least one said heteromorphic attachment, a laser gun and/or a combat suit used by a player, and a remote control switchboard, wherein the heteromorphic attachment includes a heteromorphic body and at least one movable unit which are formed by a surface rubber film, and simulate a creature having at least one moving body part, a laser transmitter is provided on the laser gun, and used for transmitting a laser encoding signal to the laser receiver of the heteromorphic attachment;

a laser receiver and a control circuit are provided on the combat suit and/or the laser gun, and used for receiving a laser pulse encoding signal transmitted by the laser transmitter in the heteromorphic attachment; and a wireless module for communicating with a wireless device and corresponding control circuit are provided on the remote control switchboard.

15. A system according to claim 14, wherein an infrared receiving tube is also provided on the combat suit and/or the laser gun, and used for receiving an infrared pulse encoding signal transmitted by the infrared transmitting tube in the heteromorphic attachment and/or the infrared transmitting tube in the dropping unit.

16. A system according to claim 14, wherein an effect controller is also provided in the system, connects to the heteromorphic attachment by way of wire of wireless, and is used to control the movements of the heteromorphic attachment.

17. A system according to claim 14, wherein a camera for monitoring is also provided in the system.

* * * * *